United States Patent [19]

Jenkner

[11] Patent Number: 5,500,067

[45] Date of Patent: Mar. 19, 1996

[54] APPARATUS AND METHODS FOR FORMING, FILLING AND SEALING FLUID FILLED CAVITIES

[76] Inventor: Brian D. Jenkner, 22318 Carmack, Marengo, Ill. 60150

[21] Appl. No.: 114,561

[22] Filed: Aug. 31, 1993

Related U.S. Application Data

[63] Continuation-in-part of Ser. No. 769,618, Oct. 1, 1991, abandoned.

[51] Int. Cl.[6] .......................... B29C 51/10; B29C 65/14; B32B 31/10
[52] U.S. Cl. .................... 156/146; 156/145; 156/245; 156/285; 156/379.8; 156/382; 156/500; 156/538; 264/500; 264/512; 264/545; 425/116; 425/504; 53/453; 53/454; 53/559; 53/900
[58] Field of Search .................................. 156/145, 146, 156/147, 245, 285, 381, 382, 292, 500, 379.8, 538; 264/500, 512, 515, 523, 524, 544, 545; 425/121, 116, 233, 504, 519, 522, 526; 53/558, 561, 559, 453, 494, 900; 141/10, 35, 59, 181

[56] References Cited

U.S. PATENT DOCUMENTS

| | | | |
|---|---|---|---|
| 2,387,747 | 10/1945 | Cowley | 53/454 |
| 2,435,950 | 2/1946 | Meher et al. . | |
| 2,949,713 | 8/1960 | Vogt | 53/453 |
| 3,186,138 | 6/1965 | Bodet | 141/59 |
| 3,245,197 | 4/1966 | Van Mil, Jr. et al. | 53/453 |
| 3,343,833 | 9/1967 | Fader . | |
| 3,423,902 | 1/1969 | Stroop | 53/559 |
| 3,424,448 | 1/1969 | Chak Ma . | |

(List continued on next page.)

FOREIGN PATENT DOCUMENTS

| | | |
|---|---|---|
| 321063 | 6/1989 | European Pat. Off. . |
| 78-047822 | 12/1978 | Japan . |
| 57-135853 | 8/1982 | Japan . |
| 655525 | 7/1951 | United Kingdom . |

OTHER PUBLICATIONS

The sharper Image Store, Oct. 1991, p. 9, The Sharper Image, 650 Davis Street, San Francisco, CA 94111.

ASIC Gel, undated, advertising publication, ASICS Tiger Corp., 10540 Talbert Ave., West Bldg., Tautan Valley, CA 92708.

Product Data Sheet, undated, Water Lock 100 Series, Grain Processing Corporation, 1600 Oregan Street, Muscantine, Iowa 52761.

Material Safety Data Sheet, Apr. 4, 1991, Water Lock 100 Series, Grain Processing Corporation, 1600 Oregan Street, Muscatine, Iowa 52761.

Material Data Safety Sheet, Mar. 31, 1991, Klucel Hydroxypropylcelluse, Aqualon Co., 2711 Centerville Rd., Wilmington, DE 19850.

Klucel Hydroxypropylcellulose, Physical and Chemical Properties, Feb. 1991, Aqualon Co., 2711 Centerville Rd., Wilmington, DE 19850.

Klucel Hydroxypropylcellulose, NF Grad for Pharmaceutical Uses, May 1990, Aqualon Co., 2711 Centerville Rd., Wilmington, DE 19850.

Taiwanese Patent Office communication dated Jul. 12, 1995, with English Language Translation.

Davidson, *Handbook of Water Soluble Gums and Resins*, selected portions from Chapter 17, 1980.

*Primary Examiner*—Michael W. Ball
*Assistant Examiner*—Richard Crispino
*Attorney, Agent, or Firm*—Juettner Pyle Lloyd & Piontek

[57] ABSTRACT

A multi-station apparatus and method of manufacture allows the manufacture of an article having a fluid filled cavity fabricated from simultaneously fed twin thermoplastic webs. A web transport means simultaneously feeds twin thermoplastic webs into an apparatus, where a oven raises the temperature of the material of the webs for thermoforming and molding. The cavity then is partially fusing to provide an injection and outlet port and a fluid is injected into the cavity, which is then sealed to provide a finished article. The fluid can be formed from a super absorbent material as a thick, viscous gel-like colloidal substance.

24 Claims, 6 Drawing Sheets

U.S. PATENT DOCUMENTS

| | | | |
|---|---|---|---|
| 3,530,636 | 9/1970 | Weprin et al. | 53/453 |
| 3,537,138 | 11/1970 | Brown et al. | 425/526 |
| 3,548,420 | 12/1970 | Spence . | |
| 3,549,472 | 12/1970 | King . | |
| 3,583,036 | 6/1971 | Brown | 425/526 |
| 3,661,815 | 5/1972 | Smith . | |
| 3,724,106 | 4/1973 | Magidson . | |
| 3,725,086 | 4/1973 | Horner | 141/10 |
| 3,783,078 | 1/1974 | Brodhead | 156/285 |
| 3,865,667 | 2/1975 | Ferrari | 156/285 |
| 3,886,125 | 5/1975 | Chromecek . | |
| 3,900,378 | 8/1975 | Yen et al. . | |
| 3,901,236 | 8/1975 | Assarsson et al. . | |
| 3,914,881 | 10/1975 | Striegel . | |
| 3,992,801 | 12/1975 | Zente . | |
| 4,017,931 | 4/1977 | Golden . | |
| 4,055,180 | 10/1977 | Karami . | |
| 4,072,635 | 2/1978 | Jeram . | |
| 4,090,013 | 5/1978 | Ganslaw et al. . | |
| 4,096,306 | 6/1978 | Larson | 156/285 |
| 4,104,214 | 8/1978 | Meierhoefer . | |
| 4,124,116 | 11/1978 | McCabe, Jr. . | |
| 4,167,502 | 9/1979 | Lewis et al. . | |
| 4,272,422 | 6/1981 | Tanaka . | |
| 4,292,972 | 10/1981 | Pawelchak et al. . | |
| 4,310,593 | 1/1982 | Gross . | |
| 4,340,057 | 7/1982 | Bloch et al. . | |
| 4,366,206 | 12/1982 | Tanaka . | |
| 4,370,768 | 2/1983 | Saloff . | |
| 4,381,320 | 4/1983 | Nguyen . | |
| 4,401,795 | 8/1983 | Herman et al. . | |
| 4,402,335 | 9/1983 | Kemmler . | |
| 4,416,790 | 11/1983 | Schurmann et al. . | |
| 4,466,634 | 5/1984 | Johnson et al. . | |
| 4,497,930 | 2/1985 | Yamasaki et al. . | |
| 4,507,438 | 3/1985 | Obayashi et al. . | |
| 4,529,739 | 7/1985 | Scott et al. . | |
| 4,567,677 | 2/1986 | Zona . | |
| 4,650,716 | 3/1987 | Gelman . | |
| 4,722,131 | 2/1988 | Huang | 264/512 |
| 4,725,628 | 2/1988 | Garvey et al. . | |
| 4,725,629 | 2/1988 | Garvey et al. . | |
| 4,731,391 | 3/1988 | Garvey . | |
| 4,749,392 | 6/1988 | Aoki et al. . | |
| 4,768,295 | 9/1988 | Ito . | |
| 4,798,603 | 1/1989 | Meyer et al. . | |
| 4,802,289 | 2/1989 | Guldager . | |
| 4,838,885 | 6/1989 | Bernardin . | |
| 4,838,947 | 6/1989 | Levy et al. . | |
| 4,942,634 | 7/1990 | Saloff et al. . | |
| 4,980,110 | 12/1990 | Nelson et al. . | |
| 4,988,344 | 1/1991 | Reising et al. . | |
| 4,994,037 | 2/1991 | Bernardin . | |
| 5,013,309 | 5/1991 | Baigas, Jr. et al. . | |
| 5,223,073 | 6/1993 | Freddi et al. | 156/500 |

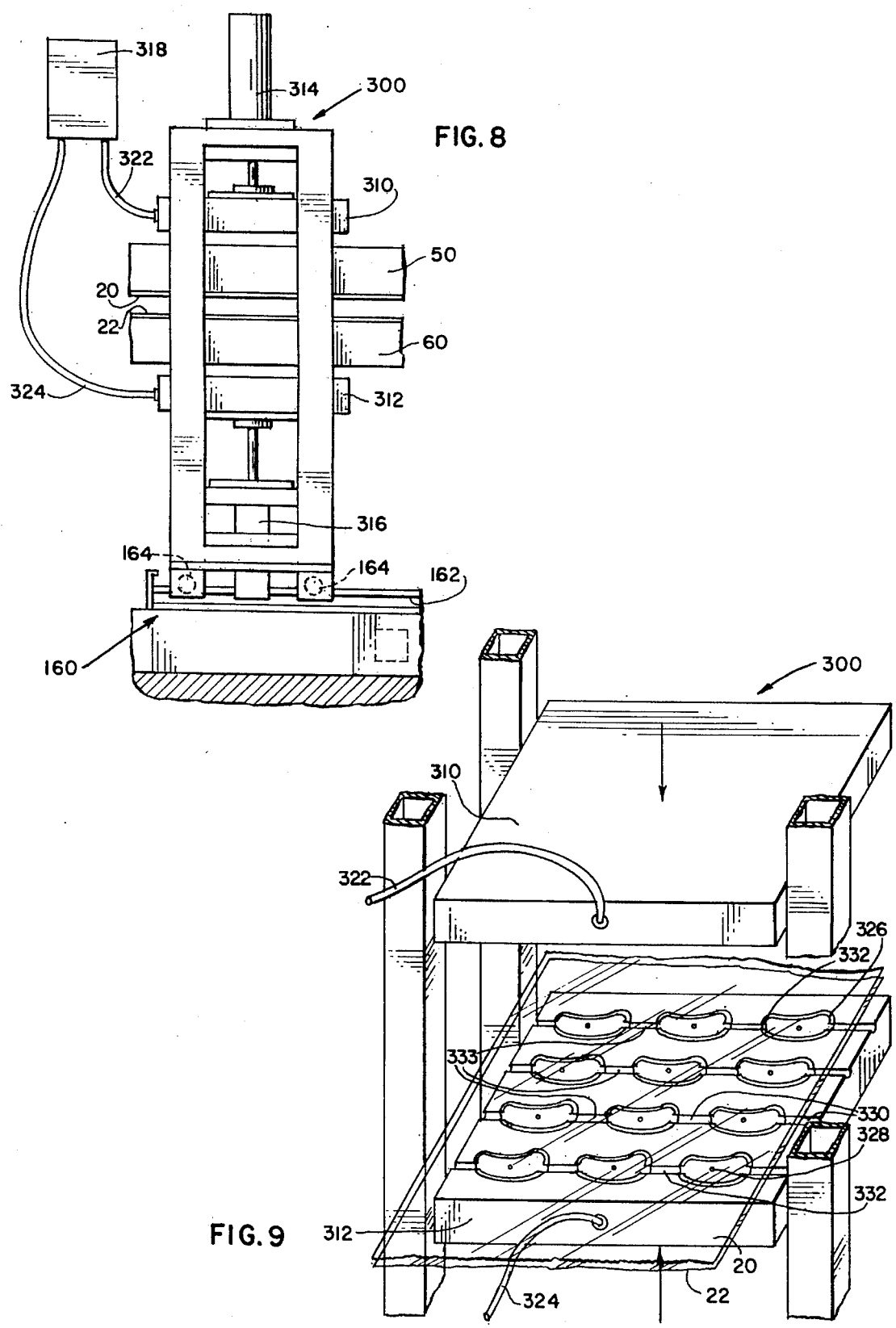

APPARATUS AND METHODS FOR FORMING, FILLING AND SEALING FLUID FILLED CAVITIES

This is a continuation-in-part application of co-pending U.S. patent application Ser. No. 07/769,618 filed Oct. 1, 1991, abandoned.

BACKGROUND OF THE INVENTION

1. Field of the Invention

The present invention relates to an apparatus and method for the manufacture of an article having a formed cavity adapted for filling with a fluid and subsequently sealed. More particularly, the present invention is directed to an apparatus and method for employing continuous twin thermoplastic webs to thermoform, fill, and seal a cavity for the manufacture of various useful articles and the packaging of consumer products.

2. Description of the Prior Art

The present invention primarily resulted from a search for a means to manufacture cost effective shock absorbing and load distributing articles for various applications, especially in the athletic footwear and medical fields. Such articles have been found useful in solving the problems created by impact loads generated during running or walking, as well as the problems encountered as a result of the concentrated loads suffered by ambulatory medical patients and those using prosthetic devices.

Running or jumping, especially during activities such as aerobics or basketball, creates very high localized loading of the human foot and ankle areas. This loading can contribute to injury of the foot, ankle and associated joints such as the hip and knee joints as well as various bones of the leg. Consequently, innovations in footwear products have rapidly developed in an effort to alleviate the problems associated with distributing the loads. These innovations typically relate to the introduction of comfort and fit improvements in athletic footwear which more evenly distribute the loads.

Additionally, efforts to relieve the discomfort and localized injury caused by bedridden medical patients and those using load-bearing artificial limbs have focused on the distribution of forces to improve comfort and fit.

Typical solutions to these problems included the use of ampules or pads constructed of flexible outer membranes hermetically filled with a liquid or a gas such as air. These devices were then inserted into the footwear or medical appliance at locations experiencing the greatest loading. Various membrane materials and associated manufacturing techniques have been employed, as well as a wide range of fillers.

Prior to the improvement of the present invention, a cavity useful for such ampules or pads was manufactured by welding two polymer sheets at locations defining the periphery of the filled portion of the finished article to form an enclosed two-dimensional pocket. This pocket was then individually filled with the desired fluid, such as a gas or liquid, under pressure to inflate the pocket and thus create an article having three dimensions. The fill port was then sealed to finish the article. With the cavity merely being an inflated pocket, it was not readily possible to obtain certain complex shapes adaptable for application to many shock absorbing and load distributing articles, as well as other articles useful for other applications. Further, the inflation pressures were limited by the material used. Moreover, as this process was limited to the inflation of single units, the economies of this process were not particularly suited to mass-produced articles. Also, blow molding technologies were found likewise unsatisfactory, as these technologies also require the time-consuming process of individually filling and sealing the articles.

The prior applications of thermoforming articles were also found inappropriate to form, fill, and seal a cavity for the manufacture of various useful articles and the packaging of consumer products. Thermoforming generally to date includes single sheet, twin sheet, or continuous single web thermoforming or vacuum forming techniques. In single sheet manufacture, the sheet was formed to the desired shape, typically after being heated to a formable temperature through ovens placed near the form molds. At an appropriate temperature, a vacuum was applied to the cavity of the mold drawing the formable sheet into the mold to form the cavity of the article. If a filler material or liquid was desired within the formed cavity, a separate sheet of thermoplastic or foil, such as lid stock, was subsequently placed over the formed and filled cavity and later sealed. Importantly, it was found difficult, and in most cases impossible, to completely fill the cavity through this process. Moreover, if an upper cavity was desired, a separately molded and bonded sheet was necessary.

Twin sheet thermoforming, a very narrowly applied technology, use the technique of thermoforming specifically for the purpose of entrapping air at atmospheric pressures between two relatively thick (typically, greater than 0.060 inch) pre-cut polymer sheets simultaneously formed to the desired shape after being heated to a formable temperature. After appropriate temperatures were obtained, a vacuum was applied to the cavity of the opposing molds, drawing the formable sheets into the molds to simultaneously form both portions of the article. As the still-heated sheets were formed together, a seal could be provided to bond the sheets at desired locations. This technique has not been found applicable for subsequently filling the voids created therein with a fluid. A common example of this limited forming technique is an insulating cooler, having an outer shell and an inner shell and encapsulated air therebetween as an insulating barrier. A separate top lid is generally provided to enclose the cooler.

In the case of continuous single web thermoforming techniques, a single thin thermoplastic web (typically 0.015 inch thick) is fed into a forming station, usually after being heated previously by an oven. The web is stopped near the molds, where a vacuum is applied to the cavity of the mold to draw the formable web portion into the mold to form the article. After forming and cooling, the molded portion is die cut from the web and the article(s) made from this single molded portion of the web can then be separated from the sheet. An example of products manufactured in this manner can be found in certain types of hamburger packaging boxes.

An example of a manufacturer of equipment for single web thermoforming is Brown Machine, of Midland, Mich. These thermoforming systems used a needle-driven conveyer system for the thin stock webs typically employed. In these systems, the needles puncture an edge of the web in a manner similar to that of computer printout paper drive mechanisms to transport the web. However, such machines were found to be of little use in the manufacture of articles such as the shock attenuating and/or load distributing articles as herein disclosed, as well as other useful articles and the packaging of consumer products according to the present invention.

One important drawback is that the web, unlike computer paper, does not have pre-punched holes for engagement by the needles. In the case of hard or elastomeric polymers (e.g., polyurethane), it has been found that the needles often do not properly puncture the edge of the web. Without proper punctures, the webs often would fall off of the conveyor system onto the ovens and create a fire hazard. Also, importantly in the context of the present invention, these needle driven systems are incapable of maintaining a suspended web against gravity where one of the conveyors is inverted to transport the upper web of a twin web thermoforming system. Thus, in the development of the present invention, it was recognized that the prior art systems using needle drive conveyers were not appropriate in the fabrication of articles having fluid filled cavities and requiring a thicker membrane thickness.

Alternatively, the molds themselves have been used to transport the web. However, given the extensive costs for an individual mold (e.g., $8,000), this transport system was not considered cost effective for the present multi-mold applications contemplated, such as the various useful articles herein disclosed and other packaging of consumer products.

Other form, fill, and seal apparatus vendors, such as Klochner, located in Florida, provide chain-driven web feeding conveyer systems. These systems, however, have never been applied to conventional thermoforming or twin web form, fill, and seal applications. They allow the transport of webs which are generally not transportable by the needles of the needle drive conveyors described above. These systems are typically used where very accurate registration is needed. Further, these systems are typically used where very thin low density polyester films (e.i., rigid polyvinylcloride films) and other films having limited stretch characteristics and tend to tear when needle driven. These systems are also typically used for packaging applications employing very thin (e.g., 0.015 inch) co-extruded films. However, such systems have never been applied to twin sheet or conventional thermoforming due to the typically thinner web thickness used in these applications.

In developing the apparatus and method of the present invention, filler liquids for their application to shock attenuating devices including included water, glycol mixtures, various oils and other liquids of relatively low viscosity were employed. Other viscosity liquids or gels, in an effort to improve the hydrostatic properties of the liquid, have incorporated semi-solids such as organosiloxane gels as the shock absorbing or load distributing material. Gas fillers have typically employed enclosed pockets of air. Whereas in the past these devices used liquids, gels, or air, depending on the desired viscosity, none apparently offered the cost effective shock attenuation and load distribution properties of articles fabricated according to the invention disclosed and claimed in the aforementioned parent patent application, which use a mixture of super absorbent materials and a liquid as the filler material.

Super absorbent materials have long been used to absorb various liquids for ready and efficient disposal in articles such as diapers, sanitary napkins, bedding pads and the like. These super absorbent materials, uniquely suited to such applications, are generally hydrophilic and absorb an enormous quantity of liquid relative to their mass through capillary action.

Improvements were generally sought to provide and produce shock attenuating and load distributing devices of high durability, low cost, and which are readily manufactured for use in footwear, medical applications and other areas where the dissipation of load over time and/or an area is desired. To this end, the feasibility of fabricating an article using super absorbent materials, in combination with an appropriate liquid, to form a low cost viscous colloidal fluid as the shock attenuating and load distribution material encapsulated in an articulable article, was sought.

Thus, in one application, the apparatus and method of the present invention can be applied to the manufacture of an improved shock attenuating and/or load distributing articles, wherein a load distributing material as a viscous colloidal fluid obtained from a combination of super absorbent material and a liquid, such as water, is injected into a vacuum-formed cavity through an injection port, which is subsequently sealed.

Importantly, however, the application of the present invention can be used for the manufacture of a wide range of different products which may be thermoformed, filled, and sealed, such as in food-stuff packaging and fluid filled consumer products (e.g., shampoo containers).

OBJECTS OF THE INVENTION

Accordingly, it is an object of this invention to provide an apparatus for the manufacture of articles having a fluid filled cavity made simultaneously from twin thermoplastic webs through a thermoforming process.

It is a further object of this invention to provide a single continuous processing apparatus to manufacture a filler receptive cavity from twin thermoplastic webs through a thermoforming process.

It is also an object of this invention to provide an apparatus to manufacture shock absorbing and load distributing articles for various applications, especially in the footwear and medical fields.

It is an additional object of this invention to provide an apparatus for the manufacture of an article for shock absorption and load distribution with a wide variety of applications from twin webs of durable and heavy thermoplastic films through a thermoforming process.

It is a further object of this invention to provide an apparatus for the manufacture of an article with a wide variety of applications from twin webs of durable and heavy elastomeric films through a thermoforming process.

It is also an object of this invention to provide a method for manufacturing an article for shock absorption in athletic footwear.

It is an additional object of this invention to provide an apparatus for the manufacture of products which may be thermoformed, filled, and sealed, such as in packaging and fluid filled consumer products.

It is a further object of this invention to provide an apparatus for the manufacture of filled articles through an outlet port of a first molded article connected to the injection port of the next molded article through gated channels.

It is a further object of this invention to provide a method for the economical manufacture an article having a fluid filled cavity from twin thermoplastic webs through a thermoforming process.

Other objects, advantages, and features of the present invention will become apparent upon reading the following detailed description and appended claims.

SUMMARY OF THE INVENTION

In accordance with this invention, a multi-station apparatus and method of manufacture is disclosed for the manufacture of an article having a fluid filled thermoformed cavity fabricated from the welding of simultaneously fed twin thermoplastic webs. A web transport means simultaneously feeds the twin thermoplastic webs into and continuously through the apparatus. An oven raises the temperature of the material of each of the two thermoplastic webs to a sufficient temperature for thermoforming and molding, through which a cavity is created and substantially fused so as to provide an injection and outlet port. A fluid injection assembly then injects a measured quantity of fluid through the injection port into the cavity, which is later sealed to provide a finished article. The fluid, in one application of the present invention, can be obtained from a super absorbent material forming a thick, viscous gel-like colloidal substance.

In this specific application, the apparatus and method of the present invention can be applied to the manufacture of an improved shock attenuating and/or load distributing articles, wherein a load distributing material or viscous colloidal fluid obtained from a combination of super absorbent material and a liquid, such as water, is injected into a vacuum-formed cavity through an injection port, which is subsequently sealed.

The finished article according to this application is highly durable, inexpensive, and readily manufacturable for use in footwear, medical applications, including surgical padding, flotation sleeping devices, and other applications where the dissipation of load over time and/or an area is desired. Of course, although this apparatus and method for the manufacture of such articles were developed for use with super absorbent materials such as a viscous colloidal fluids as the shock attenuating and load distribution material, other filler materials and applications are also contemplated.

Super absorbent materials, characterized by a capacity to absorb a high quantity of liquid to form a viscous colloidal fluid, are easily inserted into an empty cavity for shock dissipation and load distribution. Examples of super absorbent materials include WATER-LOCK A-100®, manufactured by Grain Processing Corporation, comprised of sodium acrylate-co-acrylamide as derived from corn kernel starch according to a process detailed in U.S. Pat. No. 3,661,815. Moreover, certain synthetic polymers based on acrylic acids can be advantageously employed.

In addition to discovering that the resulting viscous colloidal fluid was easily inserted into an empty bladder, it was further noted that a bladder containing such a colloidal solution of super absorbent materials and a liquid exhibited superior damping and stress/strain characteristics was ideally suited to shock dissipation and load distribution. The liquid can be water, ethylene glycol, propylene glycol, various solutions of salt water, and mixtures thereof. The only requirement for the liquid component is that it is capable of forming a viscous colloidal fluid when mixed with the super absorbent material.

The apparatus and method according to the present invention provides the means to manufacture shock absorbing articles which employ shock absorbing material as the filler material made simultaneously from twin webs of thermoformed plastic material. In particular, the invention discloses a thermoforming process utilizing automatically fed twin thermoplastic webs from cooperating twin rolls of thermoplastic film, wherein the apparatus comprises multiple processing stations.

It has thus been found that twin thermoforming webs provide a significantly more efficient system for manufacturing thermoplastic formed, filled, and sealed articles over a wide range of fluids viscosities and the thermoplastic thicknesses. An efficient manner to manufacture such devices is through a thermoforming process utilizing twin thermoplastic webs automatically fed into an apparatus where the twin webs are simultaneously and sequentially: 1) fed; 2) heated; 3) molded into the complementary shapes to form a substantially fused receiving cavity therein; 4) injected with the fluid filler material; 5) seal welded and perforated about the article periphery; and 6) finally separated into individual articles for material handling and packaging.

BRIEF DESCRIPTION OF THE DRAWINGS

Reference may be made to the following drawings illustrating the preferred embodiment of the present invention:

FIG. 8 is a side view of the vacuum molding and fusing station according to the present invention;

FIG. 9 is a perspective view of the vacuum molding and fusing station according to the present invention;

DETAILED DESCRIPTION OF THE PREFERRED EMBODIMENT

Figure 1:
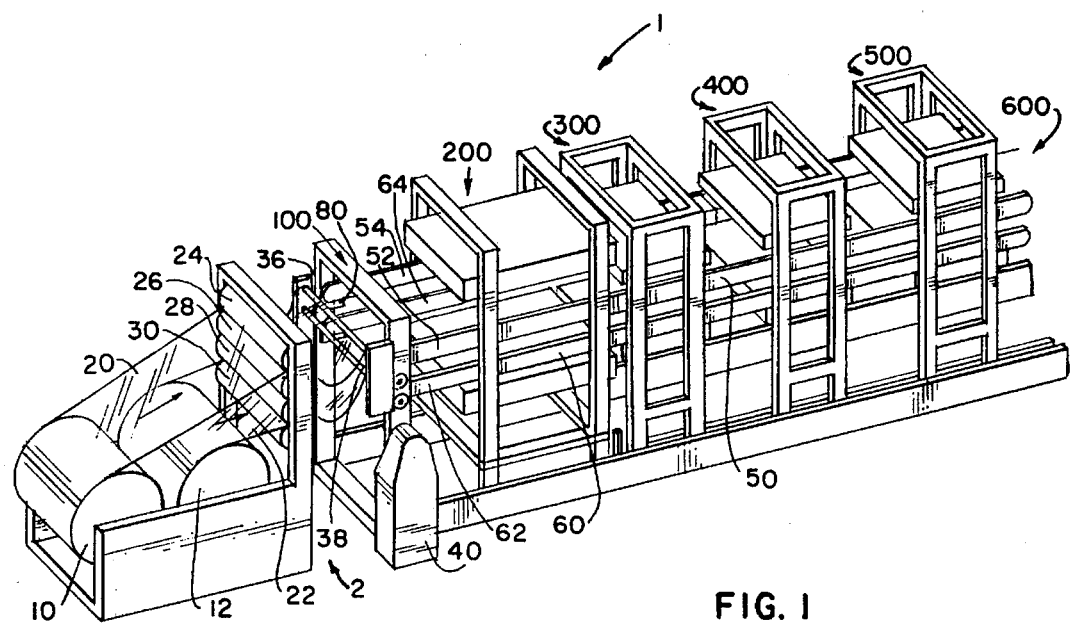
FIG. 1 provides an overall perspective view of the apparatus and method of the present invention and its various stations.

The apparatus and method according to the present invention for fabricating thermoformed articles having fluid filled cavities from twin thermoplastic webs is shown in FIGS. 1–12, wherein like reference characters reflect like features throughout the drawings.

Referring to FIG. 1, the manufacturing apparatus 1 is primarily comprised of major stations designed to perform various steps in forming the articles to be manufactured, such as shock attenuating articles. These stations include: 1) the twin thermoplastic web transport feeding station 100 for directing the webs into and through the apparatus; 2) heating station 200 for simultaneously heating the web material to its forming (or glass transition) temperature; 3) forming and fusing station 300 where the webs are positioned proximate opposing upper and lower thermoforming molds, simultaneously vacuum molded into complementary shapes, and substantially fused to form a cavity therein with only an injection port to receive the fluid and an outlet port to release air or excess fluid material from the cavity; 4) fill station 400 where the fluid is injected into the injection port; 5) the final seal and separation station 500, where both the injection and outlet ports are sealed (i.e., such as through radio frequency welding) and where a perforation about the periphery of the article is created to allow manual separation of the article from the web; and 6) the material handling station 600, where the articles are separated from the web for material handling and packaging purposes.

Figure 2:
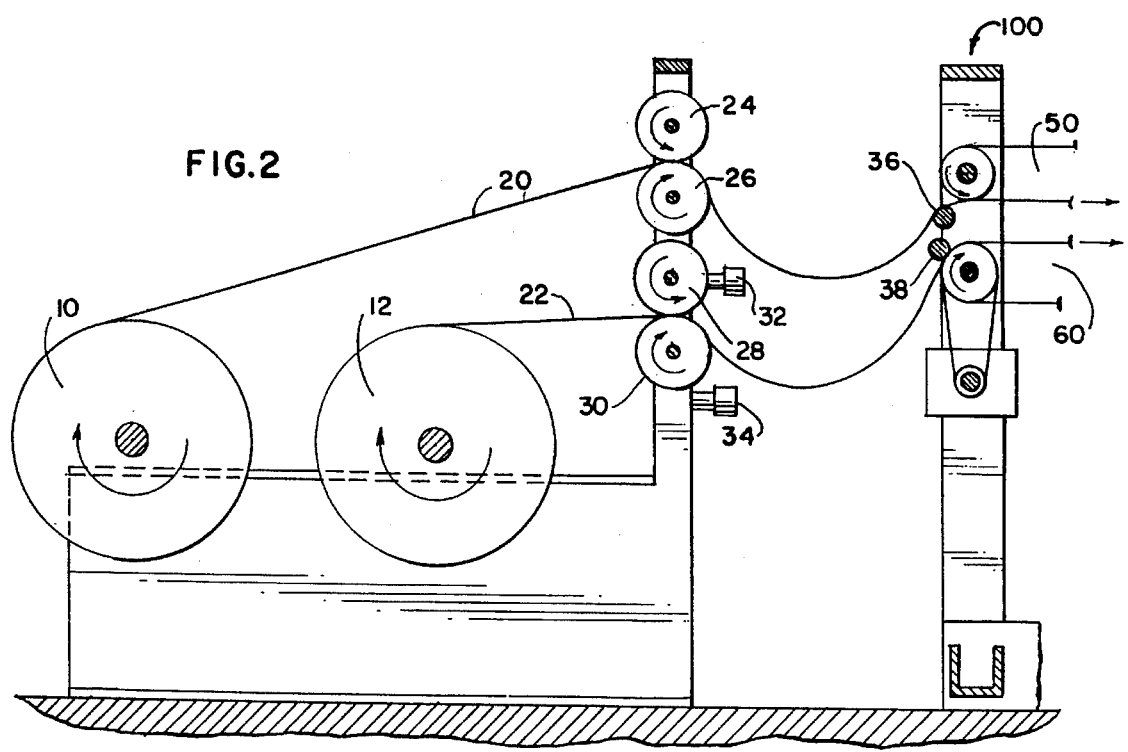
FIG. 2 is a side view of the feed rollers and first station including a portion of the transport system according to the present invention.

As shown in greater detail in FIG. 2, two rolls of thermoplastic film 10, 12 are positioned at a front end 2 of the apparatus 1. In one application, related to the manufacture of shock attenuating and/or load distributing articles or devices, the thermoplastic film is preferably ethylene-vinyl-acetate (EVA), which is primarily polyethylene with about 28% vinyl acetate polymers and can be obtained from DuPont as El Vax 360. The thickness of these films as applied to the present invention is at least 0.020 inch. Such relatively large thicknesses are required to prevent rupture in the high loading environment of the finished articles and provide a impervious barrier. Further, EVA films, when stretched, actually show an increased strength and are thus desired for the application of articles according the present invention. However, as will be detailed below, EVA films are quite difficult to seal through the use of adhesives. Thus, EVA films require raised temperatures to melt the desired area to provide such a seal.

It is not believed that thermoforming EVA films of the higher thicknesses contemplated by the present invention, in even continuous single web thermoforming machines, is known. Prior continuous single web thermoforming techniques typically employed a single thin thermoplastic web of about 0.015 inch thick, which were capable of being needle driven. Also, prior applications of EVA films, in the medical packaging industry, typically used thicknesses of 0.001–0.002 inch.

Other thermoplastic urethane films, polyvinyl chloride films, chlorinated polyethylene films, Hytrel® films by DuPont, Santoprene® films by Monsanto, and other thermoplastic film laminates may be used in this particular application in accordance with the present invention. However, it is expected that virtually any reasonably strong flexible material can be will be satisfactory in the various finished articles requiring a thermoplastic film.

Referring again to the Figures, the film from the lower and upper thermoplastic rolls 10, 12 is initially pulled as film webs 20, 22 by respective sets of upper and lower pull rolls 24, 26 and 28, 30. The pull rolls 24, 26, 28, 30 provide sufficient slack of thermoplastic films 20, 22 for input to the subsequent stations of the manufacturing apparatus. Photo-eye sensors 32, 34 verify that there is sufficient slack in the webs 20, 22 for metered input into the subsequent stations of the manufacturing apparatus 1.

Hydraulic servo drive 40 activates the lower and upper index chain drives 50, 60 to move the lower and upper thermoplastic film webs 20, 22, respectively, through the various stations of the manufacturing apparatus. The chain drives 50, 60 are indexed chain drives providing a predetermined dwell period for the webs 20, 22 at each station, as will be described below. Each of the chain drives 50, 60 are comprised of a pair of cooperating continuous chain drive conveyors 52, 54 and 62, 64, each bearing releasable clamps 70 which engage the respective outer edges of lower and upper thermoplastic film webs 20, 22.

Figure 3:
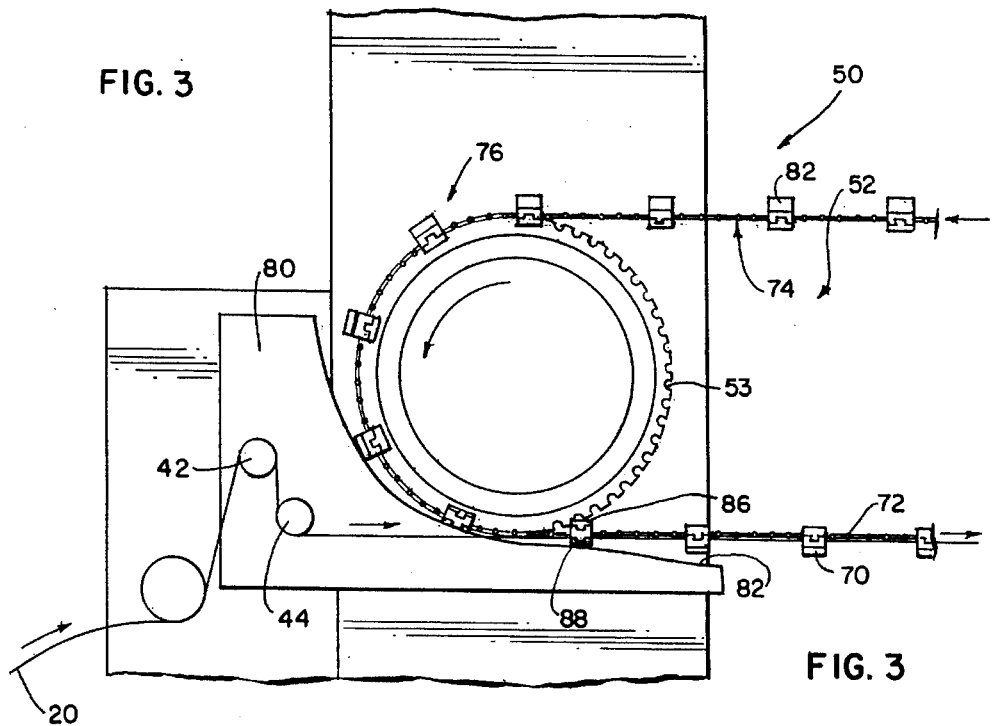
FIG. 3 is a side view of the releasable clamps which engage each of the thermoplastic webs and the operatively attached chain drive for moving the twin thermoplastic webs through the various stations of the apparatus and steps of the method according to the present invention.
Figure 4:
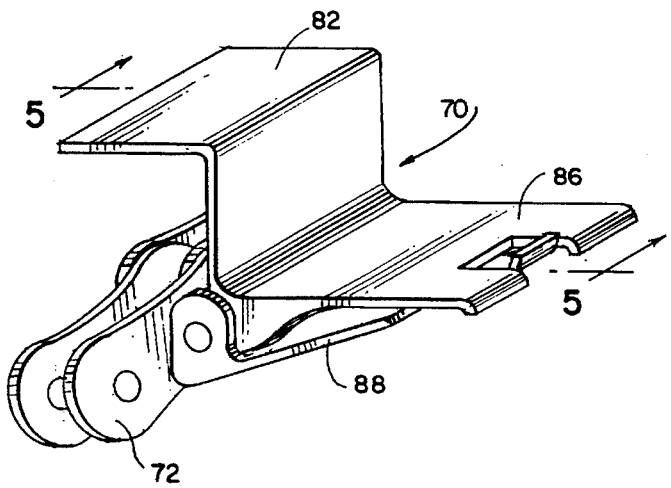
FIG. 4 is a perspective view of one of the releasable clamps for engaging each of the thermoplastic webs as attached to the chain drive as used by the apparatus and method according to the present invention.
Figure 5:
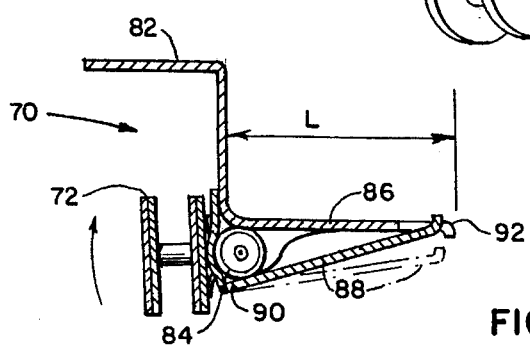
FIG. 5 is a side view of one of the releasable clamps for engaging each of the thermoplastic webs as attached to the chain drive as used by the apparatus and method according to the present invention.

The releasable clamps 70, best shown in FIGS. 3–5, are mechanically attached to the individual links 72 of the chain 74 of the continuous loop index chain drives conveyors 52, 54, 62, 64. Shown in FIG. 3 is chain drive conveyor 52. Since the chain drive conveyors 52, 54, 62, 64 are substantially identical, a detailed discussion of only chain drive conveyor 52 is provided. The conveyor 52 includes a chain drive sprocket 53 driven by the servo motor 40, as is known in the art. As the clamps 70 approach the end 76 of the chain drive conveyor 52, the releasable clamps 70 each come in contact with an engaging shoe 80 having an arcuate engaging surface 82, positioned to increasingly bear against a lever 82 of the releasable clamp 70. At a position on the sprocket 53 near the thermoplastic film web 20, the clamp 70 is biased into an open position against the resistance of a coil spring 84 normally urging opposing upper and lower jaws 86, 88 together. While open, the distance L between the base 90 and the furthest outward extension 92 of the clamp 70 is shortened by an amount equal to the original distance L less the cosine of the angle to which the clamp 70 is opened. This shortened distance is established to thus allow the introduction of the film web 20 between the open jaws 86, 88 of the clamp 70, such that when the clamp 70 is further conveyed away from the sprocket and the arcuate engaging surface 82, the jaws 86, 88 being no longer biased to the open position closes and engages an edge of the web 20. Once engaged, the mechanically linked clamps 70 guide the thermoplastic film webs 20, 22 through the subsequent manufacturing stations.

Upon exiting the final seal station 500 and prior to the material handling station 500, the clamps 70 are again biased to the open position by arcuate release shoes identical to the engaging shoes 80 to disengage the clamps 70 from the webs 20, 22.

It should be apparent from the description contained herein that the clamps 70 are ideally suited to provide a positive drive to the thermoplastic film webs 20, 22 throughout the manufacturing processes. An important aspect of the present invention is the ability to transport the webs 20, 22 a fixed distance from one station to the next (referred herein as "indexing") and maintaining a predetermined dwell period at each station limited by the longest processing time of any of the stations. Thus, it is quite important that the webs 20, 22 be conveyed accurately and be capable of being accelerated and stopped at quite precise intervals from one station to the next, often at required tolerances of 0.0005 inch.

Figure 6:
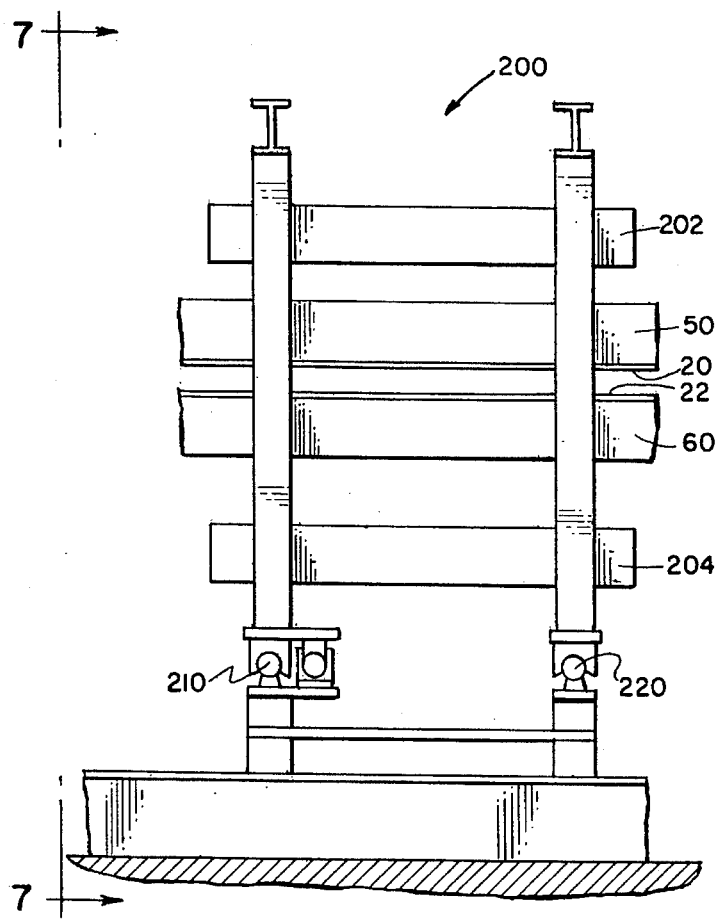
FIG. 6 is a side view of the heating station according to the present invention.
Figure 7:
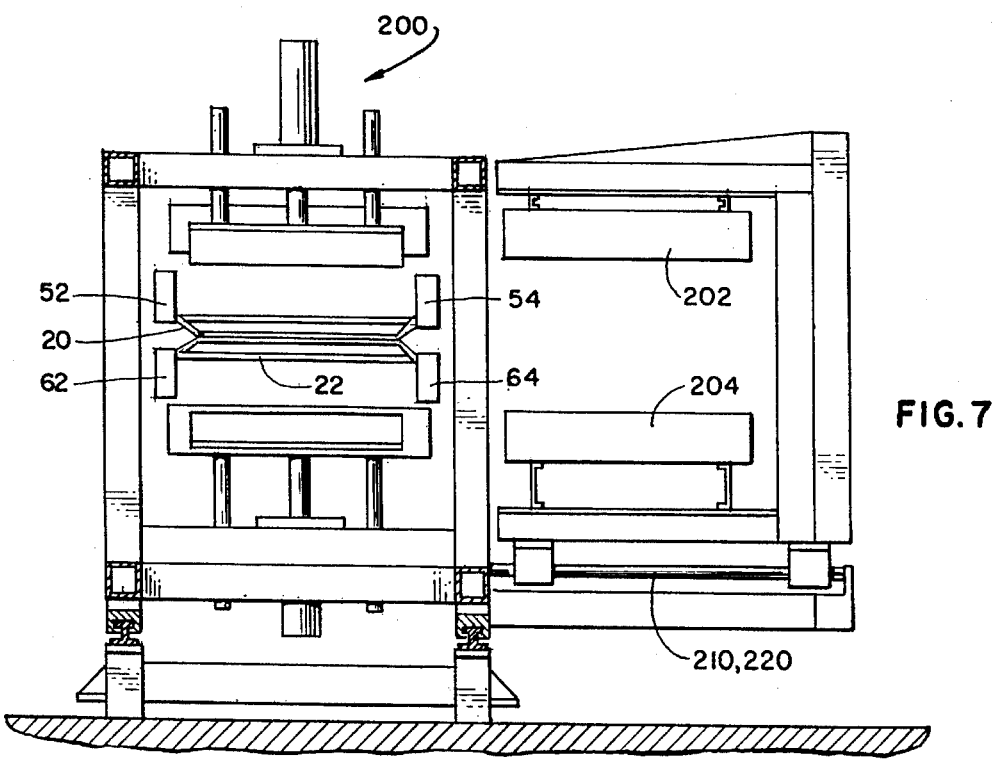
FIG. 7 is an end view of the heating station according to the present invention taken from the perspective of 7—7 in FIG. 6.

After the webs 20, 22 are securely engaged by the chain drives 50, 60 at the transport feeding station 100, the webs are transported to the heating station 200. The heating station 200 is best shown in FIGS. 6 and 7, and includes two oven 202, 204 with multiple zones and heating elements positioned above and below the upper and lower webs 20, 22, respectively. As noted above, the lower and upper chain drives 50, 60 transport the respective lower and upper 20, 22 into heating station 200 by a fixed, indexed distance.

While in proximity to the ovens 202, 204, the EVA material of the webs 20, 22 is raised to its forming (or glass transition) temperature. The upper and lower index chain 50, 60, controlled through well known indexing techniques, suspend motion of the thermoplastic films for a sufficient period of time to ensure that the temperature is reached. In the preferred embodiment, upper and lower ovens 202, 204 radiate electromagnetic energy in the infrared spectrum.

Heating station 200 also contains front and back retract cylinders 210, 220 to displace the upper and lower ovens 202, 204 from the path of the thermoplastic webs 20, 22 should it become necessary to stop the manufacturing process and to thus prevent the thermoplastic webs 20, 22 from melting. Front and back retract cylinders 210, 22 are placed on each end of the heating station 200 and cooperate with each other to provide simultaneous motion of upper and lower ovens 202, 204 into and out of heating station 200.

After the upper and lower thermoplastic webs 20, 22 are sufficiently heated by the respective upper and lower ovens 202, 204, the respective upper and lower chain drives 50, 60 move the now hot upper and lower thermoplastic film webs 20, 22 to the forming and fusing station 300 according to the index distance, shown in FIGS. 8 and 9. In order to accommodate various materials and article shapes and sizes, the forming station 300, forming and fusing station 300, fill station 400, and final seal and separation station 500 are mounted on a trolley system 160 comprising a rail 162 and interacting trolley wheels 164 provided on the framing of each station. Thus, the index distance between the stations may be readily modified according to each application.

Forming and fusing station 300 contains upper and lower cavity molds 310, 312, hydraulic presses 314, 316, and vacuum pump 318. Molds 310, 312 are mechanically attached to the hydraulic presses 314, 316. The still hot upper and lower thermoplastic webs 20, 22 are first brought into contact with each other by the through downward motion of hydraulic press 314 and mold 310 and the upward motion of hydraulic press 316 and mold 312. In the intended application, the press pressure developed is about 10,000 pounds. It will be appreciated that upper mold 312 or lower mold 314 may be replaced with a flat form if a flat surface of the molded product is desired.

A vacuum supplied by pump 318 is then applied to the molds 310, 312 through lines 322, 324 and to each of the mold cavities 326 through orifices 328 for a sufficient period of time to form the desired product, typically 0.2 seconds or more. The molds 312, 314, preferably fabricated from aluminum, push the hot upper and lower thermoplastic webs 20, 22 together about the periphery of the molds 312, 314 to substantially fuse the upper and lower thermoplastic webs 20, 22 in the shape of the finished articles. Appropriate heating or cooling of the molds 312, 314 may be necessary to control the temperature of the webs 20, 22. The fused thermoformed webs 20, 22 are thus substantially bonded around the periphery of the individual molded cavity 326 as shown in FIG. 9, leaving only injection port 330 and outlet port 332 on each of the molded articles open so that a fluid may be inserted into the molded products, as will be discussed below. This operation typically takes 10 seconds. After the indexed time, molds 312, 314 are retracted from the now fused thermoformed webs 20, 22 by upward and downward motion of hydraulic presses 314, 316. Of course, the total time at the forming and fusing station 300 is indexed by the index control and is of equal duration to all stations.

The fused thermoformed webs 20, 22 are then transported to fill station 400. It should be appreciated by the instant disclosure that the fill station 400 can be combined with the forming and fusing station 300 if the combined index times of each station result in a greater overall efficiency than allowing separate index intervals for each.

Moreover, the thermoformed cavities 326 can be designed through the present invention such that each formed product is positioned in a horizontal row of formed products in fluid communication with one another. Herein, the outlet port 332 of a first molded product in a row is connected by a gated channel 333 to the injection port 330 of the next molded product. Forming of the products in this manner enables more efficient mass production of the articles. FIG. 9 shows a typical arrangement to realize this efficiency.

Figure 10:
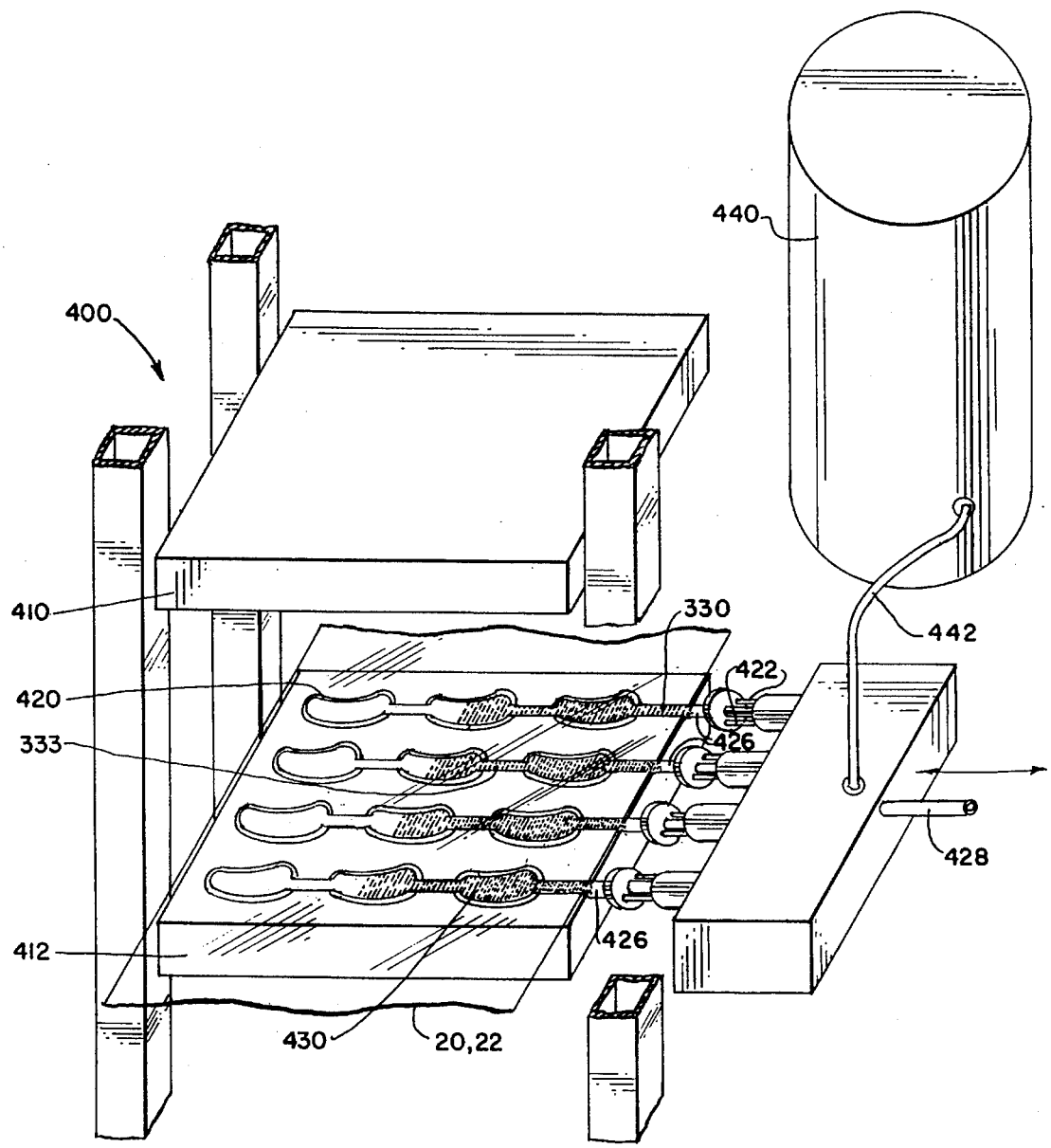
FIG. 10 is a perspective view of the fill station according to the present invention.

At the fill station 400, upper and lower cavity supports 410, 412 operated by hydraulic presses (not shown) are lowered and raised into position, respectively, to support the fused webs 20, 22 and the molded and partially fused cavities 420. Moreover, the upper and lower cavity supports 410, 412 serve to limit cavity expansion during injection, allowing a more even filling process from cavity to cavity. As best seen in FIG. 10, hydraulic cylinders 422 move injection nozzles 426 into the injection ports 330. Upper cavity support 412 is shown out of position to facilitate a view of the process. Pump pressure line 428 forces sufficient fluid 430 into through the nozzles 426 and injection ports 330 to fill each molded article cavities 420 within the webs 20, 22. Once the article cavities 420 are filled, injection nozzles 426 are then withdrawn from the injection ports 330.

The fluid material, in one application, is a super absorbent material, such as WATER-LOCK A-100®, manufactured by Grain Processing Corporation, comprised of sodium acrylate-co-acrylamide as derived from corn kernel starch according to a process detailed in U.S. Pat. No. 3,661,815. Moreover, other synthetic polymers based on acrylic acids can be used. These materials, due to their ease in preparation, can then be mixed with water, glycol, and/or pigmentation near or at station 400. A large container (not shown) is provided with an industrial mixer or agitator (not shown). The water, glycol and pigmentation are added, with the further addition of the desired super absorbent material.

The disclosed application of the fluid useful according to the present invention includes the addition of agitation of the viscous colloidal fluid to form air bubbles in the space within the sealed cavity. Thus, the ratio of volume to mass can be increased and the overall density of the sealed chamber and the overall weight of the final product can be decreased. Moreover, the addition of the air bubbles adds pneumatic cushioning to the operational characteristics of the viscous colloidal fluid, which tends to improve its performance as a shock absorbing material. Alternatively, other gases may be introduced by gas injection and other means into the viscous colloidal fluid to serve the same function.

Also, ceramic or polystyrene balls or other low density materials can be added to the viscous colloidal fluid to occupy space in the sealed cavity with material having a large volume and low mass. Thus, the overall density of the sealed chamber and the overall weight of the final product can be decreased. Further, coloring can be easily added to the viscous colloidal fluid to obtain a desired color if the resilient membrane or displaceable structure is transparent. The basic tan color of the preferred super absorbent material can thus be readily modified for appearance or color coordination purposes.

As set forth above, the use of super absorbent material in the application of shock absorbing and load distributing articles offers several advantages. First, it is quite inexpensive in comparison to the other filler fluids. Second, it is quite safe. Third, there are no requirements for special curing steps. Fourth, the pot life of the fluid, especially in the reservoir, is infinite. Fifth, and most importantly, it provides quite unique manufacturing and load capabilities perfectly suited for the manufacture of the articles as disclosed herein.

Once mixed, the fluid is added to the reservoir 440, where it is available for injection into the cavities 420 through lines 442, injection control manifold 424, and injection nozzles 426. Of course, in other applications, other fluids can be injected in accordance with the present invention.

Figure 11:
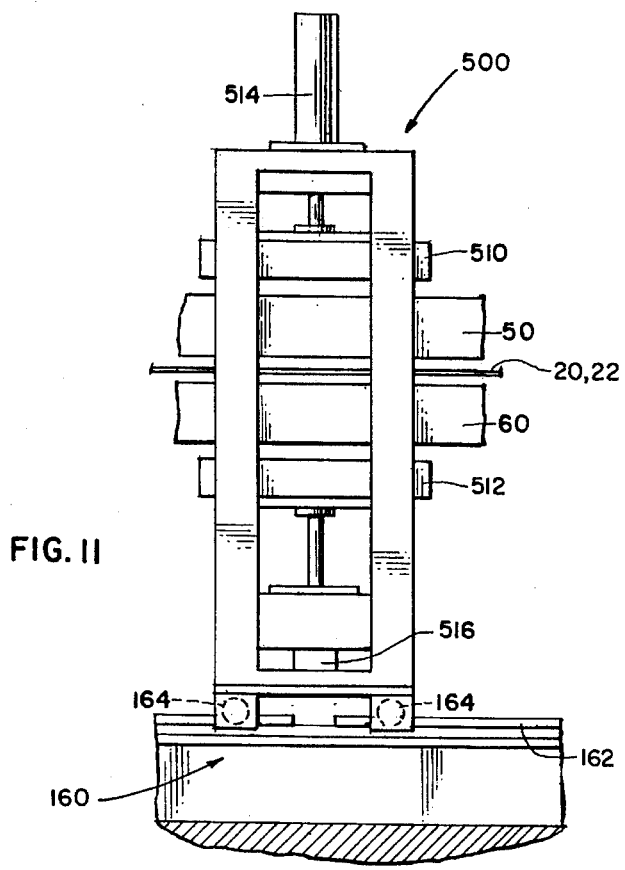
FIG. 11 is a side view of the final seal and perforation station according to the present invention.
Figure 12:
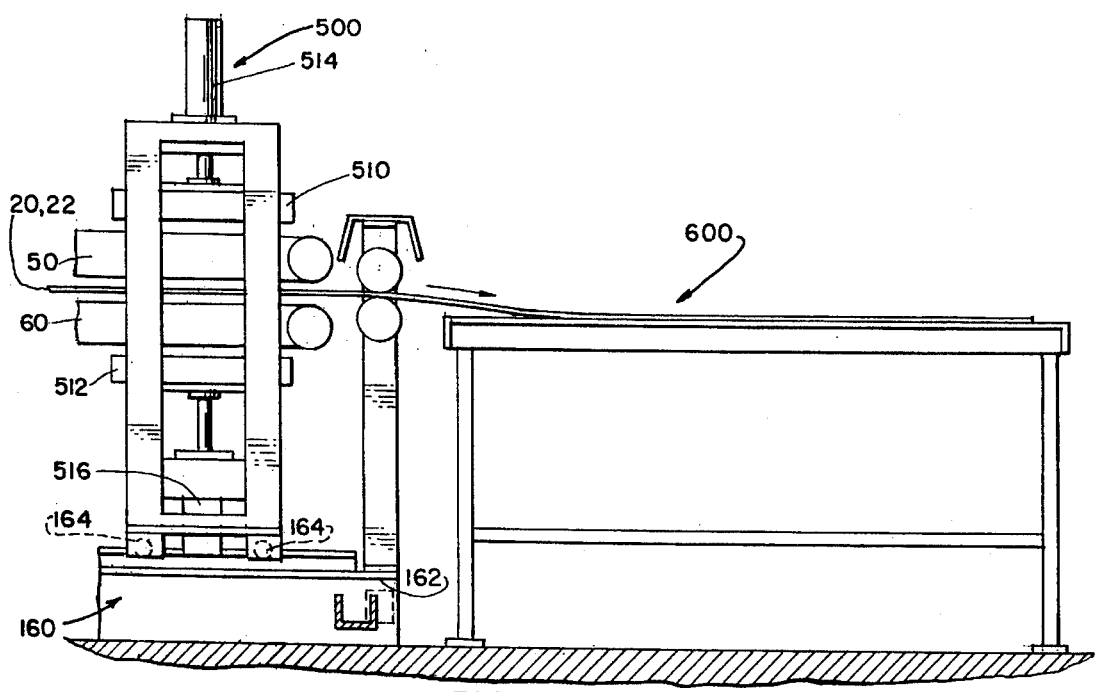
FIG. 12 is a side view of the off-load portion of the transport system and material handling station according to the present invention.

After filling, the fused thermoformed web 230 is then transported to the seal and separation station 500, shown in FIG. 11. In this station, upper and lower cavity dies 510, 512 are placed above and below the fused webs 20, 22 by hydraulic presses 514, 516. Dies 510, 512, fabricated from brass, differ from the previous molds in that they are adapted to emit high frequency radio waves or apply heat about the entire periphery of the cavities 420 for the articles, completely sealing the now filled thermoformed articles embedded in the fused webs 20, 22. The individual molded products are also provided with perforations about their periphery by high frequency radio waves. This operation typically takes 3–20 seconds.

Once sealed and perforated, the hydraulic presses 514, 516 remove the dies 510, 512 and the articles embedded in the fused webs 20, 22 are finally conveyed to the material handling station 600. In the preferred apparatus and method, the articles 420 are manually separated from the fused webs 20, 22 along their individual perforations, visually inspected and sorted for subsequent shipping. However, it is further contemplated that automatic equipment may perform this function. The waste material remaining as the webs 20, 22 can be further recycled and used for the manufacture of additional articles.

Although the present invention and its advantages have been described in detail, it should be understood that various changes, substitutions and alterations can be made herein without departing from the spirit and scope of the invention as defined by the appended claims.

I claim:

1. A multi-station apparatus for fabricating an article having a filled cavity from simultaneously fed twin thermoplastic webs, the apparatus comprising:

web transport means extending throughout the apparatus including web engaging means and web disengaging means for simultaneously feeding twin thermoplastic webs from two separate rolls of thermoplastic film into and through the apparatus, the web engaging means comprising take off rollers for metered delivery of the twin thermoplastic webs to the transport means and an upper and lower releasable clamp and an upper and lower engaging shoe, the upper engaging shoe causing the upper releasable clamp to grasp a top one of the twin thermoplastic webs when in operative contact with the upper engaging shoe and the lower engaging shoe causing the lower releasable clamp to engage a bottom one of the twin thermoplastic webs when in operative contact with the lower engaging shoe, the web disengaging means comprising the upper and lower releasable clamp and an upper and lower disengaging shoe;

an oven for raising the temperature of each of the two thermoplastic webs for subsequent thermoforming and molding;

cavity forming means for simultaneously molding the twin heated thermoplastic webs into a cavity and substantially fusing the cavity so as to provide an injection port and an outlet port;

a fluid injection assembly for injecting a fluid through the injection port into the cavity; and sealing means for sealing the injection port and the outlet port of the filled cavity, the upper disengaging shoe causing the upper releasable clamp to release the top one of the twin thermoplastic webs when in operative contact with the upper disengaging shoe subsequent the sealing of the injection port and the outlet port of the cavity and the lower disengaging shoe causing the lower releasable clamp to release the bottom one of the twin thermoplastic webs when in operative contact with the lower disengaging shoe subsequent the sealing of the injection port and the outlet port of the cavity.

2. The apparatus of claim 1, wherein the oven includes upper and lower elements for radiating electromagnetic energy in proximity to the twin thermoplastic webs sufficient to heat the twin thermoplastic webs to a forming temperature.

3. The apparatus according to claim 1, wherein the cavity forming means comprises a mold and a vacuum source for vacuum molding the cavity in the twin thermoplastic webs for substantially fusing the cavity about the periphery thereof.

4. The apparatus according to claim 1, wherein the fluid injection assembly comprises a fill injector capable of selective insertion into the injection port of the cavity for injecting a measured quantity of fluid into the cavity.

5. The apparatus according to claim 4, wherein the fluid is a mixture of super absorbent material and water.

6. The apparatus according to claim 1, wherein each of the twin thermoplastic webs has a thickness of at least 0.020 inch.

7. A multi-station apparatus for fabricating an article having a filled cavity from simultaneously fed twin thermoplastic webs, the apparatus comprising:

web transport means including web engaging means and web disengaging means for simultaneously feeding twin thermoplastic webs from two separate rolls of thermoplastic film into and through the apparatus, the web engaging means comprising take off rollers for metered delivery of the twin thermoplastic webs to the transport means and an upper and lower releasable clamp and an upper and lower engaging shoe, the upper engaging shoe causing the upper releasable clamp to grasp a top one of the twin thermoplastic webs when in operative contact with the upper engaging shoe and the lower engaging shoe causing the lower releasable clamp to engage a bottom one of the twin thermoplastic webs when in operative contact with the lower engaging shoe, the web disengaging means comprising the upper and lower releasable clamp and an upper and lower disengaging shoe;

the upper disengaging shoe causing the upper releasable clamp to release the top one of the twin thermoplastic webs when in operative contact with the upper disengaging shoe and the lower disengaging shoe causing the lower releasable clamp to release the bottom one of the twin thermoplastic webs when in operative contact with the lower disengaging shoe;

an oven for raising the temperature of each of the two thermoplastic webs for subsequent thermoforming and molding;

cavity forming means for forming a cavity from the two thermoplastic webs into a cavity and substantially fusing the cavity so as to provide an injection port and an outlet port;

fluid injection assembly for injecting a fluid through the injection port into the cavity; and sealing means for sealing the injection port and the outlet port of the filled cavity, the web transport means further including an upper and lower continuous chain drive operably connected to the upper releasable clamp and the lower releasable clamp, respectively, the chain drive being synchronized with the takeoff rollers to maintain a predetermined placement of each of the twin thermoplastic webs.

8. A multi-station apparatus for fabricating an article having a filled cavity from simultaneously fed twin thermoplastic webs, the apparatus comprising:

a first station including web transport means for simultaneously feeding twin thermoplastic webs into and through the apparatus, the web transport means including web engaging means and web disengaging means for simultaneously feeding twin thermoplastic webs from two separate rolls of thermoplastic film into and through the apparatus, the web engaging means comprising take off rollers for metered delivery of the twin thermoplastic webs from two separate rolls of thermoplastic film to the transport means and an upper and lower releasable clamp and an upper and lower engaging shoe, the upper engaging shoe causing the upper releasable clamp to grasp a top one of the twin thermoplastic webs when in operative contact with the upper engaging shoe and the lower engaging shoe causing the lower releasable clamp to engage a bottom one of the twin thermoplastic webs when in operative contact with the lower engaging shoe, the web disengaging means comprising the upper and lower releasable clamp and an upper and lower disengaging shoe;

the upper disengaging shoe causing the upper releasable clamp to release the top one of the twin thermoplastic webs when in operative contact with the upper disengaging shoe and the lower disengaging shoe causing the lower releasable clamp to release the bottom one of the twin thermoplastic webs when in operative contact with the lower disengaging shoe;

a second station for heating the material of each of the two thermoplastic webs to a sufficient temperature for thermoforming and molding;

a third station for forming a cavity from the two thermoplastic webs and substantially fusing the cavity so as to provide an injection and outlet port;

a fourth station for injecting a fluid through the injection port into the cavity; and a fifth station for sealing the injection and outlet ports of the filled cavity, the web transport means extending throughout the apparatus and being indexed such that equal distances exist between each station and the twin thermoplastic webs being caused to dwell an equal predetermined amount of time at each station.

9. A multi-station apparatus for fabricating an article having a filled cavity from simultaneously fed twin thermoplastic webs, the apparatus comprising:

a first station including web transport means for simultaneously feeding twin thermoplastic webs into and through the apparatus, the web transport means including web engaging means and web disengaging means for simultaneously feeding twin thermoplastic webs from two separate rolls of thermoplastic film into and through the apparatus, the web engaging means comprising take off rollers for metered delivery of the twin thermoplastic webs from two separate rolls of thermoplastic film to the transport means and an upper and lower releasable clamp and an upper and lower engaging shoe, the upper engaging shoe causing the upper releasable clamp to grasp a top one of the twin thermoplastic webs when in operative contact with the upper engaging shoe and the lower engaging shoe causing the lower releasable clamp to engage a bottom one of the twin thermoplastic webs when in operative contact with the lower engaging shoe, the disengaging means comprising the upper and lower releasable clamp and an upper and lower disengaging shoe, the upper disengaging shoe causing the upper releasable clamp to release the top one of the twin thermoplastic webs when in operative contact with the upper disengaging shoe and the lower disengaging shoe causing the lower releasable clamp to release the bottom one of the twin thermoplastic webs when in operative contact with the lower disengaging shoe;

a second station for heating the material of each of the two thermoplastic webs to a sufficient temperature for thermoforming and molding;

a third station for forming a cavity from the two thermoplastic webs and substantially fusing the cavity so as to provide an injection port and an outlet port;

a fourth station for injecting a fluid through the injection port into the cavity; and a fifth station for sealing the injection port and the outlet port of the filled cavity, the transport means extending throughout the apparatus and being indexed such that equal distances exist between each station, and the twin thermoplastic webs being caused to dwell an equal predetermined amount of time at each station, the transport means further including an upper and lower continuous chain drive operably connected to the upper releasable clamp and the lower releasable clamp, respectively, the chain drive being synchronized with the takeoff rollers to maintain a predetermined tension in each of the twin thermoplastic web.

10. The apparatus according to claim wherein the second station includes upper and lower elements for radiating electromagnetic energy in proximity to the twin thermoplastic webs sufficient to heat the twin thermoplastic webs to a forming temperature.

11. The apparatus according to claim 9, wherein the fourth station comprises a fill injector capable of selective insertion into the injection port of the cavity for injecting a measured quantity of fluid into the cavity.

12. The apparatus according to claim 11 , wherein the mold forms a plurality of cavities, a portion of the plurality of cavities being in fluid communication such that the outlet port of a first of the plurality of cavities is in fluid communication with the injection port of a second of the plurality of cavities.

13. The apparatus according to claim 9, wherein the twin thermoplastic web has a thickness of at least 0.020 inch.

14. A multi-station apparatus for fabricating an article having a filled cavity from simultaneously fed twin thermoplastic webs, the apparatus comprising:

a first station including web engaging means for simultaneously feeding twin thermoplastic webs from two separate rolls of thermoplastic film into and through the apparatus, the web engaging means comprising take off rollers for metered delivery of the twin thermoplastic webs into web engaging means comprising an upper and lower releasable clamp and an upper and lower engaging shoe and an upper and lower continuous chain drive operably connected to the upper releasable clamp and the lower releasable clamp, respectively, the chain drive being synchronized with the takeoff rollers to maintain a predetermined placement of each of the twin thermoplastic webs, the upper engaging shoe causing the upper releasable clamp to grasp a top one of the twin thermoplastic webs when in operative contact with the upper engaging shoe and the lower engaging shoe causing the lower releasable clamp to engage a bottom one of the twin thermoplastic webs when in operative contact with the lower engaging shoe;

a second station for heating each of the two thermoplastic webs to a sufficient temperature for thermoforming and molding;

a third station for forming a cavity from the two thermoplastic webs and substantially fusing the cavity so as to provide an injection port and an outlet port;

a fourth station for injecting a fluid through the injection port into the cavity;

a fifth station for sealing the injection and the outlet ports of the filled cavity; and web disengaging means positioned subsequent the fifth station including the upper and lower releasable clamp and an upper and lower disengaging shoe, the upper disengaging shoe causing the upper releasable clamp to release the top one of the twin thermoplastic webs when in operative contact with the upper disengaging shoe and the lower disengaging shoe causing the lower releasable clamp to release the bottom one of the twin thermoplastic webs when in operative contact with the lower disengaging shoe.

15. The apparatus according to claim 14 wherein the second station includes upper and lower elements for radiating electromagnetic energy in proximity to the twin thermoplastic webs sufficient to heat the material of the twin thermoplastic webs to its forming temperature.

16. The apparatus according to claim 14 wherein the third station comprises a mold and a vacuum source for vacuum molding the cavity in the twin thermoplastic webs for substantially fusing the cavity about the periphery thereof.

17. The apparatus according to claim 14, wherein the fourth station comprises a fill injector capable of selective insertion into the injection port of the cavity for injecting a measured quantity of fluid into the cavity.

18. A method of manufacturing an article having a filled cavity fabricated from simultaneously fed twin thermoplastic webs comprising the steps of:

simultaneously feeding the twin thermoplastic webs from two separate rolls of thermoplastic film into web engaging means, the web engaging means comprising take off rollers for metered delivery of the twin thermoplastic webs to a transport means and an upper and lower releasable clamp and an upper and lower engaging shoe, the upper engaging shoe causing the upper releasable clamp to grasp a top one of the twin thermoplastic webs when in operative contact with the upper engaging shoe and the lower engaging shoe causing the lower releasable clamp to engage a bottom one of the twin thermoplastic webs when in operative contact with the lower engaging shoe;

heating the twin thermoplastic webs to a sufficient temperature for thermoforming and molding;

simultaneously vacuum molding the twin heated thermoplastic webs into a cavity;

substantially fusing the cavity about its periphery to create an injection port and an outlet port;

filling the cavity with a fluid;

sealing the injection and the outlet ports of the cavity, and releasing the twin thermoplastic webs through disengaging means, the disengaging means including the upper and lower releasable clamp and an upper and lower disengaging shoe, the upper disengaging shoe causing the upper releasable clamp to release the top one of the twin thermoplastic webs when in operative contact with the upper disengaging shoe subsequent the step of sealing the injection and the outlet ports of the cavity and the lower disengaging shoe causing the lower releasable clamp to release the bottom one of the twin thermoplastic webs when in operative contact with the lower disengaging shoe subsequent the step of sealing the injection and the outlet ports of the cavity.

19. The method of claim 18 wherein the twin thermoplastic webs are fed equal distances between each step, the twin thermoplastic webs being caused to dwell an equal predetermined amount of time during each step.

20. The method according to claim 18 wherein heating is obtained from an upper element and a lower element radiating electromagnetic energy in proximity to the twin thermoplastic webs during the second step sufficient to heat the material of the twin thermoplastic webs to its forming temperature.

21. The method according to claim 18 wherein simultaneous vacuum molding is obtained from a mold and a vacuum source for vacuum molding the cavity in the twin thermoplastic webs for substantially fusing the cavity about the periphery thereof.

22. The method according to claim 18, wherein filling the cavity with fluid is obtained by a fill injector capable of selective insertion into the injection port of the cavity for injecting a measured quantity of fluid into the cavity.

23. A multi-station apparatus for fabricating an article having a filled cavity from simultaneously fed twin thermoplastic webs, the apparatus comprising:

horizontal web transport means including web engaging means and web disengaging means for simultaneously feeding twin thermoplastic webs in substantially a horizontal plane from two separate rolls of thermoplastic film into and through the apparatus, the web engaging means comprising take off rollers for metered delivery of the twin thermoplastic webs to the transport means and an upper and lower releasable clamp and an upper and lower engaging shoe, the upper engaging shoe causing the upper releasable clamp to grasp a top one of the twin thermoplastic webs when in operative contact with the upper engaging shoe and the lower engaging shoe causing the lower releasable clamp to engage a bottom one of the twin thermoplastic webs when in operative contact with the lower engaging shoe;

an oven for raising the temperature of each of the two thermoplastic webs for subsequent thermoforming and molding;

cavity forming means for simultaneously vacuum molding the twin heated thermoplastic webs into a cavity and substantially fusing the cavity so as to provide an injection port and an outlet port;

a fluid injection assembly for injecting a fluid through the injection port into the cavity;

sealing means for sealing the injection port and the outlet port of the filled cavity; and the web disengaging means comprising the upper and lower releasable clamp and an upper and lower disengaging shoe, the upper disengaging shoe causing the upper releasable clamp to release the top one of the twin thermoplastic webs when in operative contact with the upper disengaging shoe subsequent the step of sealing the injection and outlet ports of the cavity and the lower disengaging shoe causing the lower releasable clamp to release the bottom one of the twin thermoplastic webs when in operative contact with the lower disengaging shoe subsequent the step of sealing the injection and outlet ports of the cavity.

24. The apparatus of claim 23, further comprising an upper and lower continuous substantially horizontal chain drive operably connected to the upper releasable clamp and the lower releasable clamp, respectively, the chain drive being synchronized with the takeoff rollers to maintain a predetermined placement of each of the twin thermoplastic webs.

* * * * *